No. 782,507.   Patented February 14, 1905.

UNITED STATES PATENT OFFICE.

JOSIAH R. KELLY, OF QUINCY, ILLINOIS.

ROOFING AND SHEATHING CEMENT.

SPECIFICATION forming part of Letters Patent No. 782,507, dated February 14, 1905.

Application filed November 16, 1903. Serial No. 181,424.

*To all whom it may concern:*

Be it known that I, JOSIAH R. KELLY, a citizen of the United States, residing at Quincy, in the county of Adams and State of Illinois, have invented certain new and useful Improvements in Roofing and Sheathing Cement, of which the following is a specification.

My invention consists in an improved composition for roofing, sheathing, &c., which is waterproof, fireproof, and not affected by changes of temperature.

My composition consists of the following ingredients, combined in the proportions stated, viz: sand, twenty-five per cent.; silicate of alumina, (dehydrated,) sixty per cent.; subcarbonate of iron, Venetian red, or other ocher, fifteen per cent.; linseed-oil as a binding medium; a coating of sand on the product when spread. The silicate of alumina is reduced to an impalpable powder and subjected to a suitable degree of heat until the moisture therein is drawn off or the powder dehydrated. Sand is then dehydrated and thoroughly mixed with the silicate of alumina. The subcarbonate of iron or other ocher is then mixed with the hydrated silicate of alumina and hydrated sand and the mass thoroughly stirred together to insure a perfect mixture of these ingredients. Raw linseed or any fixed oil is then poured upon the mass in sufficient quantity to insure a proper consistency of the composition, the whole mass being thoroughly stirred to insure a proper mixture and blending of the ingredients  The composition is applied to the roof or side of a house by means of a trowel or other suitable instrument being firmly pressed against the surface, after which a coating of sand is applied to the composition.

It has been found that the composition is waterproof and fireproof and will not crack by reason of expansion and contraction.

When it is desired to apply this composition to a metallic surface, I find that better results are obtained by increasing the silicate of alumina to seventy per cent. and decreasing the subcarbonate of iron, Venetian red, or other ocher to ten per cent. and decreasing the sand to twenty per cent.

What I claim, and desire to secure by Letters Patent, is—

The herein-described roofing and sheathing cement consisting of dehydrated sand, twenty-five per cent., dehydrated silicate of alumina, sixty per cent., subcarbonate of iron fifteen per cent. and a fixed oil to insure a proper consistency.

In testimony whereof I affix my signature in presence of two witnesses.

JOSIAH R. KELLY.

Witnesses:
EDWIN S. CLARKSON,
HAROLD LEWIS.